UNITED STATES PATENT OFFICE.

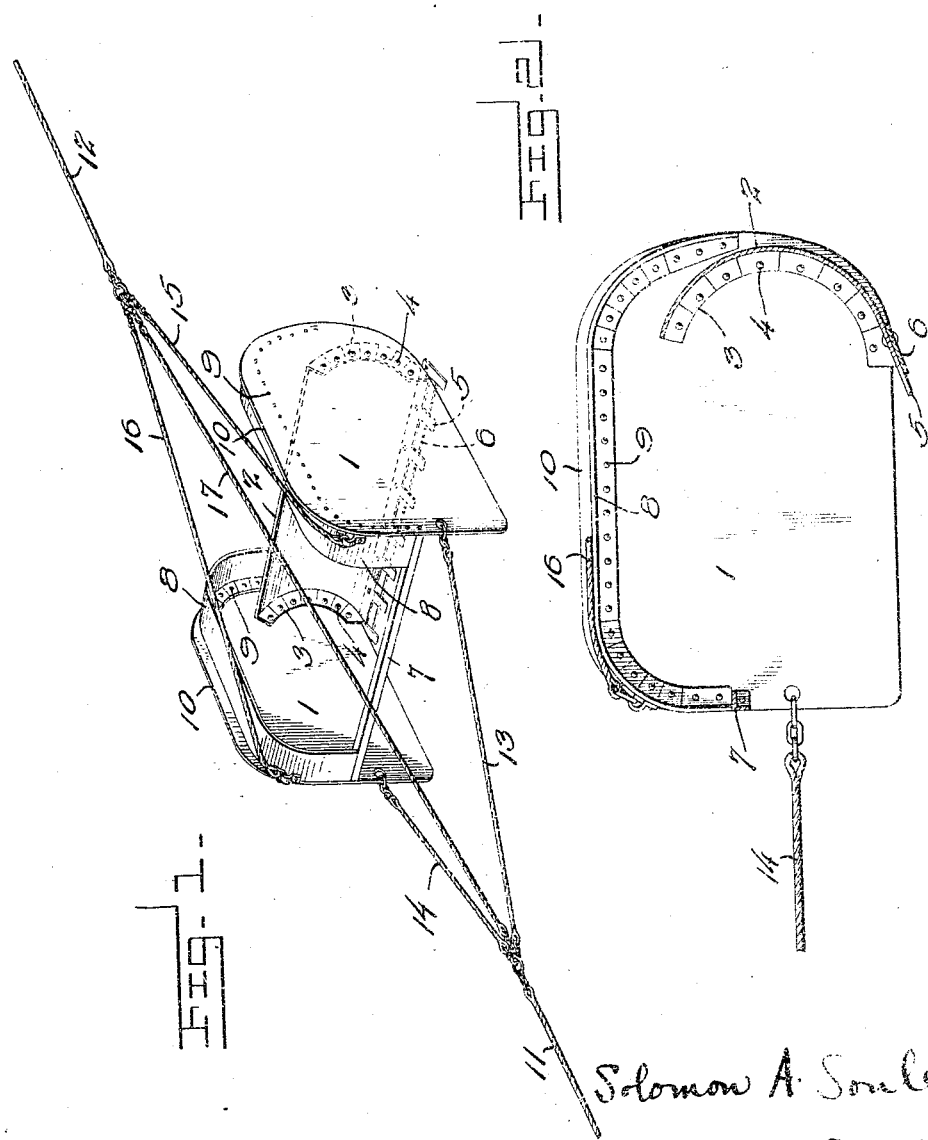

SOLOMON A. SOULE, OF FRANCES, WASHINGTON.

REVERSIBLE SCRAPER.

1,096,137.  Specification of Letters Patent.  Patented May 12, 1914.

Application filed September 9, 1913. Serial No. 788,898.

*To all whom it may concern:*

Be it known that I, SOLOMON A. SOULE, a citizen of the United States, residing at Frances, in the county of Pacific and State of Washington, have invented certain new and useful Improvements in Reversible Scrapers, of which the following is a specification.

This invention relates to scoops or graders and is especially adapted for use in hard ground as it is provided with a plurality of sharpened blades at its cutting edge.

The object of the invention is to provide a reversible scoop or grader which is at the same time efficient, durable and economical of manufacture.

The invention consists in the construction and combination of parts which will be more fully described herein and pointed out in the appended claims.

Figure 1 is a perspective view of my invention; Fig. 2 is a longitudinal sectional view of my invention.

Referring more particularly to the drawings, in which like numerals represent like parts, I provide side plates 1 which may be made of sheet steel or any other suitable material and which lie in vertical planes, parallel to each other. At the rear ends of the side plates I provide a transverse plate of sheet steel or other suitable material forming a scoop, blade or bucket 2, which is bolted to said plates and presents a concave surface toward the front end of the grader. I form angle ends on the scoop blade or bucket for the purpose of fastening it to the side plates, as shown at 3. I prefer to attach the scoop blade or bucket to the side plates by bolts shown on the drawings at 4. On the cutting edge of the transverse plate I place a plurality of sharpened cutting teeth 5 which extend a slight distance beyond the front edge of said plate. These teeth may be made separately and bolted to the plate or may be made integral therewith. These teeth are braced by a plate 6 which is bolted to the underside of the transverse plate 2. I brace the forward ends of the said plates 1 by a spacing bar 7. I provide runners 8 which are bolted to the side plates 1 a short distance below the upper edge thereof, as shown in the drawings at 9. The reveal edges 10 of the side plates act as guides for the scoop or grader when being drawn on the runners.

I provide my scoop or grader with two cables 11 and 12, extending in opposite direction, which I attach to the scoop or grader by means of yoke strands 13 and 14 and 15 and 16 which are attached to the ends of the said cables in any suitable manner. I also provide an additional cable 17 connecting the ends of the cables 11 and 12 for the purpose of relieving the side plate of the scoop or scraper from the strain which would otherwise necessarily fall upon them by reason of the weight and draft of the said cables in the operation of the scoop or grader.

It will be readily understood that a draft applied to cable 11 with the scoop or grader in the position shown in Fig. 1 of the drawings, will cause the teeth 5 to bite into the ground and the scoop blade or bucket will scoop up the earth and carry it to the dumping point, and that a draft applied to cable 12 in the opposite direction will cause the scoop to turn over on its runners by reason of their rounded ends and start back on its return trip through the connection of yoke strands 15 and 16.

Having thus described my invention what I claim as new and desire to secure by Letters Patent is:

1. A scraper comprising a pair of plane side walls having rounded rear ends upon which said scraper is adapted to roll when its direction of movement is reversed, a pair of runners inwardly extending from said side walls and lying below the upper edge of said side walls, whereby the portions of the side walls which extend above said runners serve to prevent lateral movement of the scraper, the rear ends of said runners being curved to conform to the curvature of the rear ends of said walls, and a curved scoop element extending between said side walls and rigidly affixed thereto, said scoop element being provided with a cutting portion at its lower edge.

2. A scraper comprising a pair of plane side walls having rounded rear ends upon which the scraper is adapted to roll when its direction of movement is reversed, a pair of runners inwardly extending from said side walls and lying below the upper edge of said side walls, whereby the portions of the side walls which extend above said runners serve to prevent lateral movement of the scraper, the rear ends of said runners being curved to conform to the curvature of the rear ends of said walls, and a curved scoop element extending between said side walls and rigidly affixed thereto, said scoop element being provided with a cutting portion at its lower edge, and the upper portion of said scoop element terminating some distance short of said runners.

3. A scraper comprising a pair of plane side walls having rounded rear ends upon which the scraper is adapted to roll when its direction of movement is reversed, a pair of runners inwardly extending from said side walls and lying below the upper edge of said side walls, whereby the portions of the side walls which extend above said runners serve to prevent lateral movement of the scraper, the rear ends of said runners being curved to conform to the curvature of the rear ends of said walls, a curved scoop element extending between said side walls and rigidly affixed thereto, said scoop element being provided with a cutting portion at its lower edge, and the upper portion of said scoop element terminating some distance short of said runners, and a pair of cables, one of said cables being attached to the lower forward edges of said side walls and the other of said cables being attached to the forward portions of said runners.

4. A grader having sides the rear ends of which are formed on the arc of a circle and carrying a scoop formed on the arc of a circle having a smaller diameter and having two independent cables attached to the forward end thereof in such a manner as to cause the grader to turn over upon itself when a draft is applied to one of the cables.

In testimony whereof I affix my signature in the presence of two witnesses.

SOLOMON A. SOULE.

Witnesses:
J. M. SOCKERL,
F. D. COUDEN.